United States Patent
Yuergens

(10) Patent No.: US 6,224,487 B1
(45) Date of Patent: May 1, 2001

(54) TWO STAGE TORSIONAL VIBRATION DAMPER

(75) Inventor: Kenneth C. Yuergens, Farmington Hills, MI (US)

(73) Assignee: BorgWarner Inc., Troy, MI (US)

( * ) Notice: Subject to any disclaimer, the term of this patent is extended or adjusted under 35 U.S.C. 154(b) by 179 days.

(21) Appl. No.: 08/831,198

(22) Filed: Apr. 2, 1997

(51) Int. Cl.$^7$ .................................................. F16D 3/12
(52) U.S. Cl. ........................................ 464/68; 464/63
(58) Field of Search ........................ 464/63, 66, 68; 192/213.2, 213.1, 213.21, 213.11, 213.22, 213.12; 74/574

(56) References Cited

U.S. PATENT DOCUMENTS

| | | |
|---|---|---|
| 2,042,570 | 6/1936 | Wemp . |
| 3,995,726 | 12/1976 | De Gennes . |
| 4,014,423 | 3/1977 | Werner et al. . |
| 4,485,907 | 12/1984 | Nishimura . |
| 4,493,673 | 1/1985 | Anders . |
| 4,613,029 | 9/1986 | Beccaris . |
| 4,637,500 | 1/1987 | Gobel ........................................ 464/63 |
| 4,690,257 | 9/1987 | Suzuki et al. . |
| 4,716,998 | * 1/1988 | Tsukamoto et al. ............... 192/213.2 |
| 4,782,933 | 11/1988 | Jackel . |
| 4,941,860 | 7/1990 | Graton ............................. 192/213.21 |
| 5,139,122 | * 8/1992 | Maeda et al. ...................... 192/213.2 |
| 5,246,399 | 9/1993 | Yanko et al. ........................... 464/63 |
| 5,636,718 | * 6/1997 | Nomoto et al. ................... 192/213.2 |
| 5,657,845 | 8/1997 | Szadkowski et al. . |

FOREIGN PATENT DOCUMENTS

| | | |
|---|---|---|
| 547245 | 10/1985 | (AU) . |
| 1425208 | 11/1968 | (DE) . |
| 19638613A1 | 3/1997 | (DE) . |
| 2361575 | 3/1978 | (FR) . |
| 2066416A | 7/1981 | (GB) . |
| 2124734 | 2/1984 | (GB) . |

* cited by examiner

Primary Examiner—Lynne H. Browne
Assistant Examiner—Greg Binda
(74) Attorney, Agent, or Firm—Reising, Ethington, Barnes, Kisselle et al.; Greg Dziegielewski

(57) ABSTRACT

A torsional vibration damper has an outer drive plate connected to a pair of retainer plates by an outer array of damping springs disposed partly in windows formed in the outer drive plate and partly in first windows formed in the retainer plates, and an inner drive plate which is connected to the retainer plate by an inner array of damping springs disposed partly in second windows formed in the retainer plates and partly in windows formed in the inner drive plate. The adjacent peripheries of the drive plates have a plurality of notches that are defined by radial tangs that are arranged in confronting pairs when the torsional vibration damper is in a neutral position. The retainer plates are spaced apart and connected to each other by drive blocks that are disposed partly in each notch of the outer drive plate and partly in each notch of the inner drive plate. The drive blocks engage the radial tangs of the drive plates to limit the relative angular displacements of the drive plates with respect to the retainer plates and the compression of the damping springs. The retainer plate carries an annular friction disk that is biased into engagement with the inner drive plate by a spring.

8 Claims, 2 Drawing Sheets

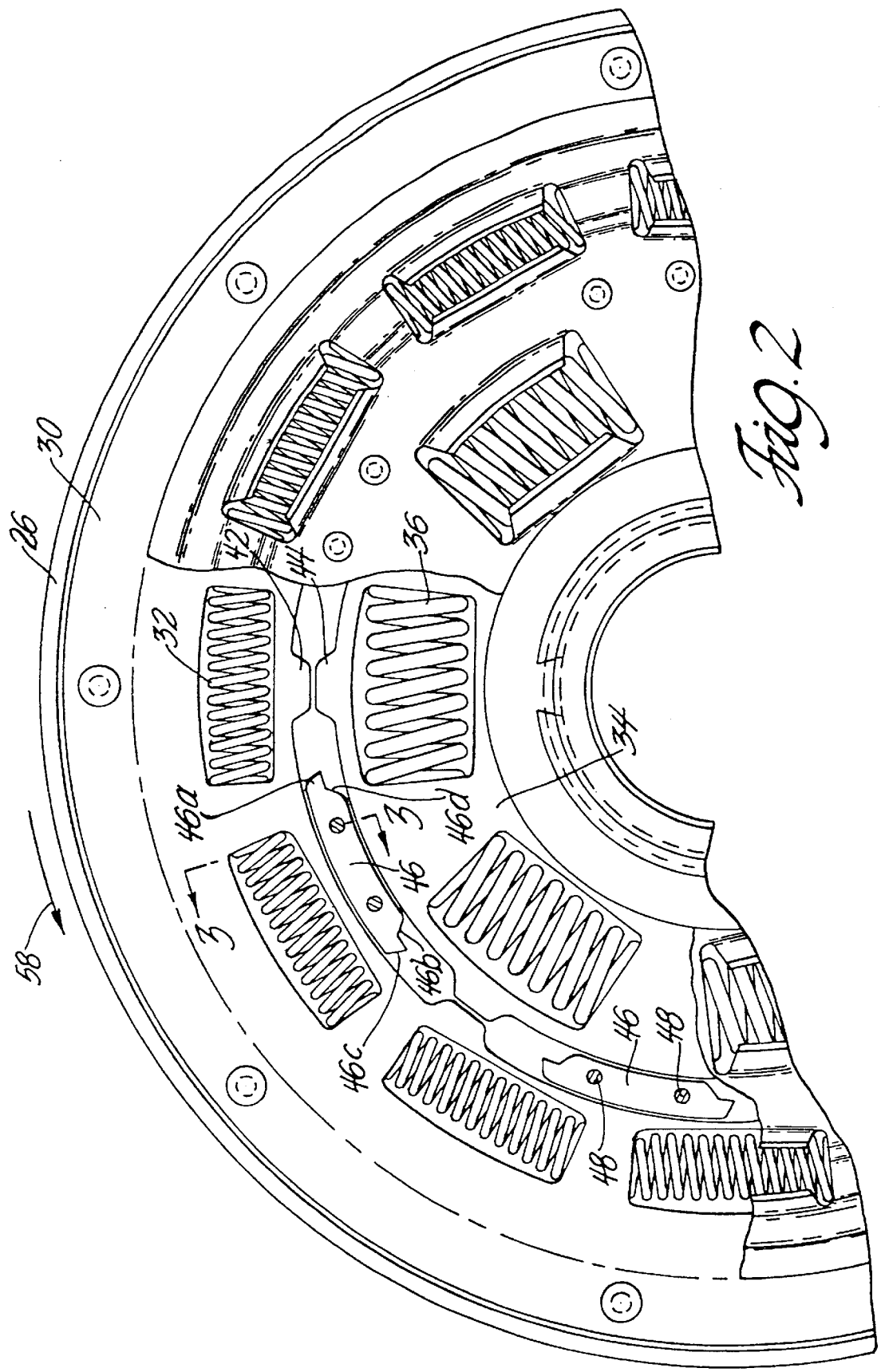

TWO STAGE TORSIONAL VIBRATION DAMPER

This invention relates generally to torsional vibration dampers and more particularly to two stage torsional vibration dampers having inner and outer annular arrays of damping springs.

BACKGROUND OF THE INVENTION

U.S. Pat. No. 4,941,860 granted to Michel Graton Jul. 17, 1990 discloses a two-stage torsional vibration damper particularly for automotive vehicles having an inner annular array of damping springs partially disposed in windows of an inner drive plate and an outer annular array of damping springs partially disposed in windows of an outer drive plate. The inner and outer drive plates have notches in their adjacent peripheries that form passages. The notches of the respective drive plates are offset circumferentially with respect to each other and disposed on a pitch circle that is between the inner and outer annular arrays of damping springs. The two arrays of damping springs are retained by two retainer plates on opposite sides of the drive plates. The retainer plates are connected to each other by spacer pins that pass through passages formed by the notches in the adjacent peripheries of the inner and outer drive plates. The spacer pins serve as stops that limit the angular displacements of the inner and outer drive plates with respect to the retainer rings so that the compression of damping springs is also limited.

One drawback of the Graton torsional vibration damper is that only half of the spacer pins function as stops to limit the angular displacements of the inner and outer drive plates and compression of the damping springs. Every other spacer pin or half of the spacer pins act as stops when the damper is driven in the clockwise direction and the other half act as stops for counterclockwise drive. Another drawback is that the Graton torsional vibration damper requires very long notches in the adjacent peripheries of the drive plates so that each drive plate has very few abutments for the spacer pins to stop against. For instance, the preferred embodiment disclosed in the Graton patent has six spacer pins and only three pads on each drive plate that serve as abutments for the spacer pins to stop against.

Still another drawback is that the Graton torsional vibration damper is limited to an even number of spacer pins in order to provide a balanced stop arrangement.

A still further drawback of the Graton torsion damper is in the use of complicated friction dampers that are expensive to manufacture and difficult to assemble. One friction damper arrangement comprises two friction rings and a Belleville washers that must be shaped to accommodate the spacer pins as shown in FIGS. 1, 2 and 3 of the Graton patent drawing. Another Graton friction damper arrangement comprises a plurality of fiber reinforced synthetic bushes having rectangular heads that are alternately arranged as shown in FIGS. 4 and 5 of the Graton patent drawing.

U.S. Pat. No. 5,246,399 granted to John P. Yanko et al Sep. 21, 1993 discloses a two stage torsional vibration damper that has an improved stop arrangement for limiting the angular displacements of the inner and outer drive plates and compression of the damping springs which avoids several drawbacks of the Graton torsional vibration damper discussed above.

The Yanko two stage torsional vibration damper is characterized by a ring member that is disposed between the inner and outer drive plates in the radial direction and fastened between the retainer plates in the axial direction. The ring member has circumferentially spaced enlargements that include a plurality of stop surfaces that limit the angular displacements of the inner and outer drive plates with respect to the retainer plates and the compression of the inner and outer arrays of damping springs. Each enlargement of the Yanko member acts as a stop in each drive direction thereby increasing the number of functional stops in comparison to the Graton arrangement significantly. The notches in the adjacent peripheries of the inner and outer drive plates are also relatively short in comparison to the Graton arrangement so that the number of abutments for engaging the stops is also increased significantly. For instance the preferred embodiment disclosed in the Yanko patent has eight tangs on each drive plate that serve as abutments for the stop surfaces of the ring member. Moreover the Yanko torsional vibration damper does not require an even number of tangs for a balanced stop arrangement. Hence the Yanko stop arrangement provides higher torque resistance and greater design freedom in comparison to the Graton stop arrangement.

While the Yanko arrangement is an improvement over the Graton arrangement, further improvements are possible. For instance, the Yanko ring member is a machined forging that is relatively expensive to manufacture. The Yanko ring member also requires radial space between the tangs of the inner and outer drive plates, which can reduce the number of damping springs, increase the overall diameter of the torsional vibration damper, and/or introduce weaknesses in the drive plates.

SUMMARY OF THE INVENTION

The object of this invention is to provide improvements over the two-stage torsional vibration damper disclosed in the Yanko patent and still further improvements over the two-stage torsional vibration damper disclosed in the Graton patent.

A feature of the invention is that the two stage torsional vibration damper has a plurality of individual drive blocks that are radially disposed between inner and outer drive plates that all function as stops to limit the angular displacements of the drive plates with respect to the retainer plates and compression of the damping springs in either drive direction. These individual drive blocks reduce manufacturing costs and radial space requirements significantly in comparison to the Yanko ring member.

Another feature of the invention is that the two-stage torsional vibration damper has stops in the form of individual drive blocks that are shaped and securely fastened to the retainer plates to resist shear forces.

Still another feature of the invention is that the two stage torsional vibration damper has a plurality of drive blocks that center the drive plates with respect to each other as well as act as stops for limiting the angular displacements of the drive plates with respect to the retainer plates.

Yet another feature of the invention is that the two stage torsional vibration damper has inner and outer drive plates that have confronting pairs of tangs at their adjacent peripheries that serve as abutments for the individual drive blocks that are disposed between the drive plates.

Still yet another feature of the invention is that the two stage torsional vibration damper includes a friction damper comprising an annular friction ring and Belleville washer that is economical, easily assembled and does not need to accommodate the drive blocks that hold the retainer plates together.

These and other objects, features and advantages of the invention will become apparent from the description below, which is given by way of example with reference to the accompanying drawing.

BRIEF DESCRIPTION OF THE DRAWING

FIG. 2 is a section taken substantially along the line 2—2 of FIG. 1 looking in the direction of the arrows.

DESCRIPTION OF THE PREFERRED EMBODIMENT

Figure 1:
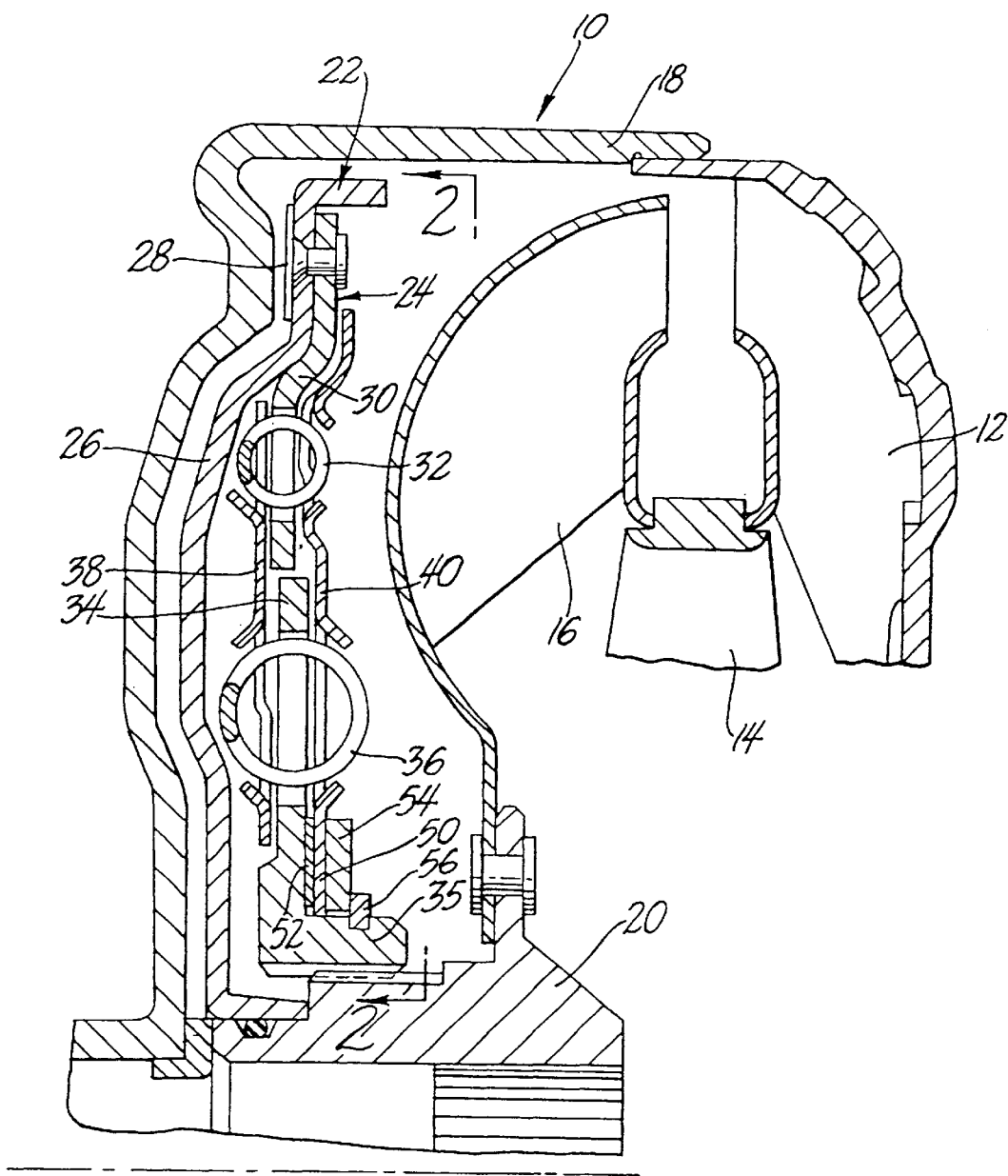
FIG. 1 is a fragmentary longitudinal section of an automotive torque converter equipped with a two-stage torsional vibration damper in accordance with the invention.

Referring now to the drawing, the two stage torsional vibration damper of the invention is illustrated in FIG. 1 in connection with a lock-up torque converter 10 that comprises a pump impeller 12 (input member), a stator or reactor 14 and a turbine 16 (output member). The pump impeller 12 is driven by an engine (not shown) through the housing 18 that is attached to the periphery of the impeller 12. The turbine 16 drives a turbine hub 20 connected to a drive shaft (not shown). The lock up-torque converter 10 further comprises a lock-up clutch 22 for driving the turbine hub 20 directly from the housing 18 at a one-to-one ratio and the two stage torsional vibration damper 24 of the invention for damping engine vibration when the turbine hub 20 is driven directly from the housing 18.

The lock-up clutch 22 comprises a pressure plate 26 that has a inner flange that slides on a collar portion of the turbine hub 20 so that it moves toward and away from an end wall of the housing 18. The pressure plate 26 carries a friction pad 28 at its outer circumferential end. The operation of a lock-up clutch in a torque converter is well known and need not be described in detail. Briefly, the friction pad 28 is pressed against the housing 18 when hydraulic or mechanical pressure is applied to the pressure plate 26 so that the housing 18 drives the pressure plate 26 which in turn drives the turbine hub 20 through the two stage torsional vibration damper 24.

The torsional vibration damper 24 comprises an outer drive plate 30; an outer array of coil shaped damping springs 32 partially disposed in windows in the outer drive plate; an inner drive plate 34; an inner array of coil shaped damping springs 36 disposed in windows in the inner drive plate; and left hand and right hand retainer plates 38 and 40. The outer drive plate 30 is attached to the pressure plate 26 at the outer margin by rivets. The inner drive plate 34 has an inner hub 35 that is spline connected to the turbine hub 20.

The retainer plates 38 and 40 each have an inner and outer series of windows that are shaped to retain the damping springs 32 and 36 as best shown in FIG. 2. Damping springs 32 are partially disposed in the outer series of windows and retained in the windows of the outer drive plate 30 by the retainer plates 38 and 40. Damping springs 36 are partially disposed in the inner series of windows and retained in the windows of the inner drive plate 34 by the retainer plates 38 and 40. See FIG. 1.

The inner periphery of the outer drive plate 30 has a plurality of circumferentially spaced notches that are defined by radial tangs 42 at each end. The outer periphery of the inner drive plate 34 also has a plurality of circumferentially spaced notches that are defined by radial tangs 44 at each end. The radial tangs 42 and 44 are arranged in pairs and confront each other in the radial direction when the torsional damper 24 is in a neutral position, that is, when the lock-up clutch 22 is disengaged and the damper 24 is not transmitting torque, as shown in FIG. 2.

Figure 3:
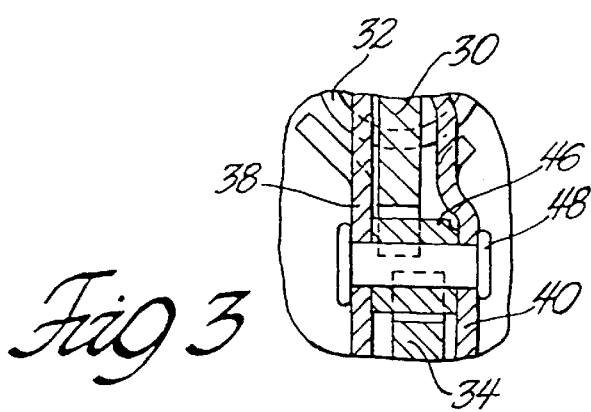
FIG. 3 is a section taken substantially along the line 3—3 of FIG. 2 looking in the direction of the arrows.

The retainer plates 38 and 40 are spaced apart by drive blocks 46 and fastened together by rivets 48 that pass through holes in the drive blocks 46 as shown in FIGS. 2 and 3. The drive blocks 46 are arcuate in shape and fit between the drive plates 30 and 34 in the radial direction in the notches defined by the radial tangs 42 and 44 of the respective drive plates 30 and 34 as shown in FIG. 2. The drive blocks 46 limit the angular displacements of the outer drive plate 30 and the inner drive plate 34 with respect to the retainer plates 38 and 40 and the compression of the damping springs 32 and 36 by engaging the radial tangs 42 and 44 of the respective drive plates. Each drive block 46 is attached between the retainers 38 and 40 in the axial direction by two circumferentially spaced rivets 48. This increases shear resistance and prevents rotation of the drive blocks 46 in response to shear loads imposed by the tangs 42 and 44.

The drive blocks 46 preferably engage the circumferential walls of the peripheral notches in the inner and outer drive plates 30 and 34 so that the drive blocks 46 center the drive plates 30 and 34 with respect to each other in the radial direction. The right hand retainer 40 extends radially inwardly to provide an integral backing plate 50 in proximity to the hub 20. An annular friction disk 52 is bonded to the inner face of the backing plate 50 that confronts the inner drive plate 34. A Belleville washer 54 is mounted on the inner hub 35 of the drive plate 34 and retained by a C-clip 56 so that the Belleville washer 54 engages the outer face of the backing plate 50 and biases the annular friction disk 52 into engagement with the inner drive member 34. This produces drag when the retainer plate 40 moves angularly relative to the inner drive plate 34 and provides a hysteresis effect in well-known manner.

The two stage torsional vibration damper 24 operates as follows:

When the lock-up clutch 22 engages, housing 18 drives pressure plate 26 which drives the outer drive plate 30 of the two stage torsional vibration damper 24. Outer drive plate 30 drives retainer plates 38 and 40 through the outer array of damper springs 32. Retainer plates 38 and 40 then drive the inner drive plate 34 through the inner array of damper springs 36. Inner drive plate 34 then drives the turbine hub 20 and output shaft (not shown). During this process the damper springs 32 and 36 are compressed and dampen engine vibrations by incremental expansions and contractions while the engine torque is being transmitted through the torsional vibration damper 24.

Compression of the damping springs 32 and 36 is limited by the stop arrangement comprising the drive blocks 46 and the radial tangs 42 and 44 of the respective drive plates 30 and 34. Assuming that the outer drive plate 30 is driven in the counterclockwise direction as indicated by the arrow 58 in FIG. 2, the outer damping springs 32 are compressed until the outer tangs 42 engage the outer, right hand stop surfaces 46a of the drive blocks 46. On the other hand, the inner dampen springs 36 are compressed until the inner, left hand stop surfaces 46b of the drive blocks 46 engage the inner tangs 44.

The drive blocks 46 are symmetrical so the outer, left hand stop surfaces 46c and the inner right hand stop surfaces 46d cooperate with the tangs 42 and 44 to limit spring compression when the outer drive member 30 is driven in the clockwise direction.

The drive blocks 46 are shaped so that the tangs 42 of the outer drive plate 30 bottom out on the drive blocks 46 before the drive blocks 46 bottom out on the tangs 44 of the inner drive plate 34 so that the inner damping springs 36 are still operative when the outer damping springs 32 are collapsed to the limit. Drive blocks 46 can be shaped so that both arrays of damping springs 32 and 36 reach their limit simultaneously or so that the inner damping springs 36 reach their limit first. These three variations can also be accomplished by varying the circumferential width of the confronting pairs of tangs 42 and 44 with respect to each other.

The two-stage torsional vibration damper 24 of this invention uses a plurality of individual drive blocks 46 and a corresponding number of confronting pairs of radial tangs 42 and 44 of the drive plates 30 and 34 which all operate to limit compression of the damping springs 32 and 36. These drive blocks can be manufactured economically by employing powdered metal technology and the drive blocks 46 do not take up any radial space between the radial tangs 42 and 44.

Moreover the torsional vibration damper 24 includes a friction damper which is economical and easily assembled because the friction damper comprises an annular friction disk that is bonded to a backing plate that is an integral extension of one retainer plate and a biasing spring that is mounted on a hub of the inner drive plate.

The invention has been described in an illustrative manner, and it is to be understood that the terminology, which has been used, is intended to be in the nature of words of description rather than of limitation. For instance, the torsional vibration damper 24 has been illustrated in connection with a lock-up torque converter whereas numerous other applications are possible including the flywheel application shown in the Graton patent discussed above.

Obviously, many modifications and variations of the present invention in light of the above teachings may be made. It is, therefore, to be understood that, within the scope of the appended claims, the invention may be practiced otherwise than as specifically described.

I claim:

1. A torsional vibration damper comprising an outer drive plate connected to a pair of retainer plates by means of an outer array of damping springs disposed partly in windows formed in the outer drive plate and partly in first windows formed in the retainer plates, and an inner drive plate which is connected to the retainer plates by means of an inner array of damping springs disposed partly in second windows formed in the retainer plates and partly in windows formed in the inner drive plate with the inner drive plate being mounted coaxially with respect to said outer drive plate and located within the space defined radially by the outer drive plate, characterized in that:

the outer drive plate has an inner periphery and a plurality of notches in the inner periphery that are defined by a plurality of radial tangs and the inner drive plate has an outer periphery of notches in the outer periphery that are defined by a plurality of radial tangs, the radial tangs of the outer and inner drive plates being arranged in confronting pairs when the torsional vibration damper is in a neutral position;

the retainer plates being spaced apart and connected to each other by means of individual drive blocks that are disposed partly in the notch of the outer drive plate and partly in the notch of the inner drive plate; and the drive blocks have surfaces at each end for engaging the radial tangs of the outer drive plate and the radial tangs of the inner drive plate to limit the relative angular displacements of the outer drive plate and the inner drive plate with respect to the retainer plates.

2. The torsional vibration damper as defined in claim 1 further characterized in that the drive blocks are symmetrical.

3. The torsional vibration damper as defined in claim 1 further characterized in that each of the drive blocks is attached to the retainer plates by two circumferentially spaced rivets.

4. The torsional vibration damper as defined in claim 1 further characterized in that the drive blocks are arcuate and engage circumferential surfaces of the notches in the inner and the outer drive plates to center the drive plates with respect to each other.

5. The torsional vibration damper as defined in claim 1 further characterized in that one retainer plate extends radially inwardly and carries an annular friction disk on an inner surface confronting the inner drive plate and the inner drive plate carries a spring engaging an outer surface of the one retainer plate to bias the annular friction disk into engagement with the inner drive plate to create a hysteresis effect.

6. A torsional vibration damper comprising an outer drive plate connected to a pair of retainer plates by means of an outer array of damping springs disposed partly in windows formed in the outer drive plate and partly in first windows formed in the retainer plates, and an inner drive plate which is connected to the retainer plates by means of an inner array of damping springs disposed partly in second windows formed in the retainer plates and partly in windows formed in the inner drive plate with the inner drive plate being mounted coaxially with respect to said outer drive plate and located within the space defined radially by the outer drive plate, characterized in that:

one retainer plate extends radially inwardly and carries an annular friction disk on an inner surface confronting the inner drive plate and the inner drive plate carries a spring that engages an outer surface of the one retainer plate to bias the friction disk into engagement with the inner drive plate to create a hysteresis effect.

7. The torsional vibration damper as defined in claim 6 further characterized in that the inner drive plate has an inner drive hub and the spring is a Belleville washer that is carried on the inner drive hub and retained by a C-clip fastened to the inner drive hub.

8. A torsional vibration damper comprising an outer drive plate connected to a pair of retainer plates by means of an outer annular array of damping springs disposed partly in windows formed in the outer drive plate and partly in first windows formed in the retainer plates, and an inner drive plate which is connected to the retainer plates by means of an inner annular array of damping springs disposed partly in second windows formed in the retainer plates and partly in windows formed in the inner drive plate with the inner drive plate being mounted coaxially with respect to said outer drive plate and located within the space defined radially by the outer drive plate, characterized in that:

the outer drive plate has an inner periphery and a plurality of notches in the inner periphery that are defined by a plurality of radial tangs and the inner drive plate has an outer periphery and a plurality of notches in the outer periphery that are defined by a plurality of radial tangs, the radial tangs of the outer and inner drive plates being arranged in confronting pairs when the torsional vibrating damper is in a neutral position;

the retainer plates being connected to each other by means of individual symmetrical drive blocks that are disposed on a pitch circle the diameter of which is smaller than that of which the outer annular array of damping springs is arranged and greater than that of which the inner annular array of damping springs is arranged; each drive block being disposed partly in the notch of the outer drive plate and partly in the notch of the inner drive plate to center the drive plates with respect to each other and each drive block having surfaces at each end for engaging the radial tangs of the outer drive plate and the inner drive plate to limit the relative angular displacements of the outer drive plate and the inner drive plates with respect to the retainer plates; and each of the drive blocks is attached to the retainer plates by two circumferentially spaced rivets.

* * * * *